United States Patent
Koga et al.

(10) Patent No.: US 7,780,285 B2
(45) Date of Patent: Aug. 24, 2010

(54) WATER BASE INK FOR INK-JET RECORDING AND INK-JET PRINTER ACCOMODATING SAME

(75) Inventors: Narumi Koga, Nagoya (JP); Masaya Fujioka, Nagoya (JP); Kazuma Goto, Nagoya (JP); Mayuko Okada, Toyota (JP); Tatsunosuke Hoshi, Nagoya (JP); Narumi Kawai, Nagoya (JP); Shunichi Higashiyama, Yotsukaichi (JP); Junichiro Sugimoto, Aichi-ken (JP); Hideo Ohira, Tajimi (JP); Michiko Aoyama, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1099 days.

(21) Appl. No.: 10/802,652

(22) Filed: Mar. 16, 2004

(65) Prior Publication Data

US 2004/0182280 A1 Sep. 23, 2004

(30) Foreign Application Priority Data

Mar. 17, 2003 (JP) ............................... 2003-072463
Mar. 17, 2003 (JP) ............................... 2003-072464
Mar. 17, 2003 (JP) ............................... 2003-072465

(51) Int. Cl.
*G01D 11/00* (2006.01)

(52) U.S. Cl. ........................ 347/100; 347/96; 106/31.13

(58) Field of Classification Search ................. 347/100, 347/95, 96, 101; 106/31.6, 31.13, 31.27; 523/160
See application file for complete search history.

(56) References Cited

U.S. PATENT DOCUMENTS 5,116,409 A * 5/1992 Moffatt ...................... 347/100

(Continued)

FOREIGN PATENT DOCUMENTS

JP 7207202 8/1995

(Continued)

*Primary Examiner*—Manish S Shah
(74) *Attorney, Agent, or Firm*—Frommer Lawrence & Haug LLP

(57) ABSTRACT

A water base ink for ink-jet recording contains a self-dispersible coloring agent, a propylene glycol ether, and a surfactant represented by the following general formula (3):

$$R^1-O-(CH_2CH_2O)_n-SO_3M \qquad (3)$$

wherein $R^1$ represents an alkyl group having a number of carbon atoms of 12 to 15, M represents Na or triethanolamine, and n represents an integer of 2 to 4, and wherein the propylene glycol ether is dipropylene glycol propyl ether. The ink satisfies three requirements of i) the satisfactory initial introduction performance of the ink into an ink flow passage of a stacked type printer head, ii) the prevention of the occurrence of feathering, and iii) the prevention of the insufficient spread of the ink.

7 Claims, 3 Drawing Sheets

U.S. PATENT DOCUMENTS

| | | | |
|---|---|---|---|
| 5,529,617 A | 6/1996 | Yamashita et al. | |
| 5,888,287 A * | 3/1999 | Brown et al. | 106/31.58 |
| 6,004,389 A * | 12/1999 | Yatake | 106/31.86 |
| 6,063,834 A * | 5/2000 | Kappele et al. | 523/160 |
| 6,375,728 B2 | 4/2002 | Yamashita et al. | |
| 6,485,138 B1 * | 11/2002 | Kubota et al. | 347/100 |
| 6,679,598 B2 * | 1/2004 | Kato et al. | 347/100 |
| 2001/0045175 A1 * | 11/2001 | Ouchi et al. | 106/31.6 |
| 2002/0043179 A1 | 4/2002 | Norimatsu et al. | |
| 2003/0061967 A1 * | 4/2003 | Satoh et al. | 106/31.89 |
| 2003/0195275 A1 * | 10/2003 | Sanada et al. | 523/160 |
| 2003/0218661 A1 * | 11/2003 | Okada et al. | 347/100 |

FOREIGN PATENT DOCUMENTS

| | | | |
|---|---|---|---|
| JP | 8170041 | | 7/1996 |
| JP | 8-259864 | | 10/1996 |
| JP | 8-283631 | | 10/1996 |
| JP | 8283631 | | 10/1996 |
| JP | 88333532 | | 12/1996 |
| JP | 2001081372 | | 3/1998 |
| JP | 10279869 | | 10/1998 |
| JP | 11228898 | | 8/1999 |
| JP | 11293150 | | 10/1999 |
| JP | 2000072991 | | 3/2000 |
| JP | 2000-191973 | * | 7/2000 |
| JP | 2002-53784 | | 2/2002 |

* cited by examiner

WATER BASE INK FOR INK-JET RECORDING AND INK-JET PRINTER ACCOMODATING SAME

BACKGROUND OF THE INVENTION

1. Field of the Invention

The present invention relates to a water base ink for ink-jet recording to be used for an ink-jet recording apparatus.

2. Description of the Related Art

In the ink-jet recording system, ink droplets are formed by using the ink discharge system including, for example, the electrostatic attraction method, the method in which mechanical vibration or displacement is applied to the ink by using a piezoelectric element, and the method in which bubbles are generated by heating the ink to utilize the pressure generated thereby. All or a part of the ink droplets are adhered to a recording objective material such as paper to perform the recording. Those usable as the water base ink for ink-jet recording to be used for the ink-jet recording system as described above include those which are obtained by dissolving or dispersing a variety of water-soluble dyes or pigments in water or a liquid medium composed of water and a water-soluble organic solvent.

In order to perform the satisfactory recording over a long period of time, for example, the following conditions are required for the water base ink for ink-jet recording as described above. That is, characteristic values including, for example, those of the viscosity, the surface tension, and the density are appropriate values; any deposit is not formed and/or physical values are not changed, for example, by the heat in order to avoid any clog-up at the nozzle and the orifice of the ink-jet recording apparatus so that the ink is discharged in a stable manner; and the recorded image is excellent, for example, in water resistance and light resistance.

When the recording is performed with an ink-jet printer by using a general water base ink for ink-jet recording, any exclusive ink-jet paper is sometimes used in order to obtain a satisfactory printing quality without any blurring. However, in recent years, it is more demanded that the recording is performed on the regular paper rather than on the exclusive ink-jet paper, in consideration of the running cost and the environment. Further, in the market directed to homes and offices, it is overwhelmingly demanded that the recording is performed with the colors rather than with the black-and-white or monochrome. Therefore, the color ink-jet printer is dominantly used. It is demanded that the color recording can be performed with a good printing quality on the regular paper.

However, the printing quality on the regular paper is still insufficient. Major factors therefor may include various factors. One of such factors is the problem called "feathering". In this case, the ink is nonuniformly blurred along the paper fibers of the recording paper when the ink is permeated into the recording paper. The edges of image portions are notched, and it is impossible to obtain any sharp edge of the image portion.

In relation to such circumstances, a method, in which the surface tension is increased to obtain an ink composition that scarcely causes the blurring or spread into the paper fibers of the recording paper, has been hitherto widely known as a general technique for improving the printing quality by avoiding the feathering. For example, Japanese Patent Application Laid-open No. 8-259864 discloses a technique in which the surface tension of an ink is made to be not less than 40 mN/m so that the permeation of the ink along the recording paper surface is suppressed and the feathering is avoided.

However, in the case of this method, the wettability of the ink with respect to the paper is deteriorated, and ink portions, which are adjacent to one another on the recording paper, are not continued to give a discontinuous state, resulting in such a printing quality that the spread of the ink is insufficient. In order to avoid such an inconvenience, it is also conceived that an extremely large amount of the ink is discharged. However, in this case, new problems arise, for example, such that the cost is unsatisfactory and the ink is dried over an excessively long period of time. Therefore, an ink is required, which is spread appropriately and uniformly with an appropriate amount of droplets.

On the other hand, a method has been widely used as a general technique for enhancing the permeability of the water base ink for ink-jet recording, in which mutually adjoining ink droplets are continued to one another on the recording paper to improve the printing quality by blending, as a permeating agent, alkyl ether of polyvalent alcohol such as diethylene glycol monobutyl ether to an ink, or by blending a surfactant thereto. For example, Japanese Patent Application Laid-open No. 8-283631 discloses a technique in which a specified permeating agent and a surfactant are blended to an ink to lower the surface tension so that the permeability into the paper is enhanced. However, in the case of this method, it is impossible to suppress the phenomenon in which the ink is nonuniformly spread along the paper fibers. As a result, the edges of image portions are blurred, and the feathering tends to occur.

As described above, the conventional water base ink for ink-jet recording has involved such a problem that it is difficult to satisfy both of the prevention of the feathering and the prevention of the insufficient ink spread on the regular paper.

Further, another problem arises such that the ink is not discharged upon the start of use if the water base ink for ink-jet recording is not introduced smoothly into an ink flow passage of a printer head when a new ink cartridge is installed to an ink-jet printer. Therefore, it is also required for the water base ink for ink-jet recording that the initial introduction performance of the ink into the printer head is excellent in addition to the requirements for the prevention of the feathering and the prevention of the insufficient spread of the ink as described above.

Figure 2:
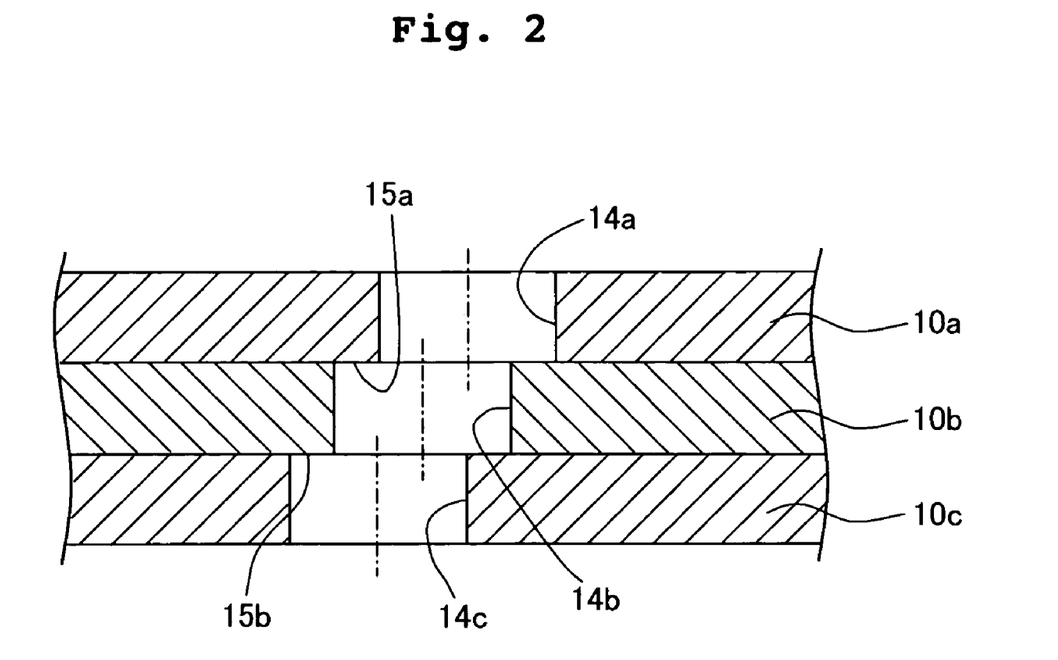
FIG. 2 shows a partial magnified sectional view schematically illustrating a part of the stacked type printer head.

However, in recent years, the miniaturization is advanced for the printer head for the ink-jet printer. For example, a stacked or laminated type printer head is known as a printer head for a piezoelectric ink-jet printer based on the use of piezoelectric elements, which is formed by stacking a plurality of sheets formed with parts of ink flow passages. In the case of the stacked type printer head, the miniaturization is realized at the low cost, and the ink flow passage, which is narrow and which has a complicated structure, can be formed therein. However, bubbles or foams tend to remain, for example, at bent sections 15a, 15b formed on the inner circumferential surfaces of ink flow passages 14a, 14b, 14c and in gaps formed between stacked sheets 10a, 10b, 10c as shown in FIG. 2. It has been impossible to smoothly introduce the water base ink for ink-jet recording into the ink flow passages, and it has been especially difficult to satisfy the initial introduction performance of the ink. FIG. 2 shows a partial magnified sectional view illustrating the stacked type printer head.

In view of the above, a method is known as a method for improving the initial ink introduction performance of the water base ink for ink-jet recording, in which an appropriate amount of a surfactant is added to the water base ink for ink-jet recording to lower the surface tension down to an optimum value in order to improve the wettability with respect to the inner wall of the ink flow passage of the printer head.

However, in the case of the method in which the surfactant is added to the water base ink for ink-jet recording to lower the surface tension so that the initial introduction performance of the water base ink for ink-jet recording into the ink flow passage is improved, the following problem arises. That is, the wettability with respect to the recording paper is increased simultaneously with the decrease in the surface tension of the ink, and the edges of image portions are blurred to cause the feathering. In other words, the conventional water base ink for ink-jet recording has involved such a problem that it is difficult to satisfy both of the initial introduction performance of the ink into the printer head (especially into the stacked type printer head) and the prevention of the feathering.

As described above, when the recording is performed on the regular paper by using the conventional technique, the following problem has arisen. That is, all of or any one of the troubles arise, for example, such that the feathering is caused on the recording paper, the ink is insufficiently spread on the recording paper, and any trouble occurs in relation to the initial introduction performance of the ink into the printer head. As a result, it has been impossible to obtain any one which has the satisfactory printing quality.

SUMMARY OF THE INVENTION

The present invention has been made in order to solve the problems as described above, an object of which is to provide a water base ink for ink-jet recording which is satisfactory in the initial introduction performance of the ink into an ink flow passage of a printer head mounted on an ink-jet printer, especially of a stacked type printer head and which does not cause the feathering and the insufficient spread of the ink even when the recording is performed on the regular paper.

According to a first aspect of the present invention, there is provided a water base ink for ink-jet recording comprising at least a dispersible coloring agent, a propylene glycol ether, and a surfactant composed of a random copolymer represented by the following general formula (1).

$$R\text{—}O\text{—}((CH_2CH_2O)_n\cdot(CHCH_3CH_2O)_m)\text{—}H \tag{1}$$

In the general formula (1), R represents an alkyl group having a number of carbon atoms of 3 to 5, and m=n=50 is satisfied.

The water base ink for ink-jet recording according to the first aspect contains the dispersible coloring agent, the propylene glycol ether, and the surfactant composed of the random copolymer represented by the general formula (1). The propylene glycol ether includes, in its molecular structure, the frame of $(CHCH_3CH_2O)$ which is a lipophilic component. Therefore, even when the amount of addition is small, the permeation into the paper is excellent. Thus, it is possible to prevent from the insufficient spread of the ink without affecting the feathering of the ink on the recording paper. The surfactant, which is composed of the random copolymer represented by the general formula (1), possesses both of the surface-active function and the defoaming or antifoaming function without deteriorating the foregoing effect of the propylene glycol ether. Therefore, it is possible to realize the improvement in wettability with respect to the ink flow passage of the printer head and the quick elimination of foams or bubbles which are generated in the ink flow passage or which are allowed to flow into the ink flow passage.

According to a second aspect of the present invention, there is provided a water base ink for ink-jet recording comprising a dispersible coloring agent; a propylene glycol ether; and a surfactant composed of a block copolymer represented by the following general formula (2).

$$HO\text{—}(CH_2CH_2O)_n\text{—}(CHCH_3CH_2O)_m\text{—}(CH_2CH_2O)_n\text{—}H \tag{2}$$

In the general formula (2), m represents an integer of 30 to 36, and n represents an integer of 13 to 24.

The water base ink for ink-jet recording according to the second aspect contains the dispersible coloring agent, the propylene glycol ether, and the surfactant composed of the block copolymer represented by the general formula (2) described above. The propylene glycol ether includes, in its molecular structure, the frame of $(CHCH_3CH_2O)$ which is a lipophilic component. Therefore, even when the amount of addition is small, the permeation into the paper is excellent. Thus, it is possible to prevent from the insufficient spread of the ink without affecting the feathering of the ink on the recording paper. The surfactant, which is composed of the block copolymer represented by the general formula (2) described above, possesses both of the surface-active function and the defoaming or antifoaming function without deteriorating the foregoing effect of the propylene glycol ether. Therefore, it is possible to realize the improvement in wettability with respect to the ink flow passage of the printer head and the quick elimination of bubbles or foams which are generated in the ink flow passage or which are allowed to flow into the ink flow passage.

According to a third aspect of the present invention, there is provided a water base ink for ink-jet recording comprising:

a dispersible coloring agent;

a propylene glycol ether; and a surfactant represented by the following general formula (3).

$$R^1\text{—}O\text{—}(CH_2CH_2O)_n\text{—}SO_3M \tag{3}$$

wherein n represents an integer of 2 to 4, $R^1$ represents an alkyl group having a number of carbon atoms of 12 to 15, and M represents Na or triethanolamine.

The water base ink for ink-jet recording according to the third aspect contains the dispersible coloring agent, the propylene glycol ether, and the surfactant represented by the general formula (3). The propylene glycol ether includes, in its molecular structure, the frame of $(CHCH_3CH_2O)$ which is a lipophilic component. Therefore, even when the amount of addition is small, the permeation into the paper is excellent. Thus, it is possible to prevent from the insufficient spread of the ink without affecting the feathering of the ink on the recording paper. Further, it is possible to realize the improvement in wettability with respect to the ink flow passage of the printer head and the quick release of bubbles or foams which are generated in the ink flow passage or which are allowed to flow into the ink flow passage to the outside of the ink flow passage without deteriorating the foregoing effect of the propylene glycol ether owing to the surface-active function possessed by the surfactant represented by the general formula (3) described above.

According to the present invention, there is also provided an ink cartridge which accommodates each of the inks as defined in the first to third aspects. The ink cartridge may have, for example, a chamber for accommodating a single color ink or a plurality of chambers for accommodating inks having different colors. The ink cartridge may be installed to a head of an ink-jet printer. Alternatively, the ink cartridge may be installed to a main body of an ink-jet printer, for example, a case.

According to a fourth aspect of the present invention, there is provided an ink-jet printer comprising:

an ink-jet head which has an ink flow passage formed of an Ni alloy and which discharges an ink; and an ink cartridge which accommodates the ink as defined in the third aspect of the present invention, the ink being supplied to the ink-jet head. The ink is satisfactory in wettability with respect to the ink flow passage formed of the Ni alloy. Therefore, the initial introduction performance of the ink is excellent. The ink flow passage may be formed in a stack composed of sheets formed of an Ni—Fe alloy.

DESCRIPTION OF THE PREFERRED EMBODIMENTS

As a result of diligent investigations performed by the present inventors, it has been found out that the initial introduction performance of the ink is excellent and it is possible to avoid, for example, the feathering and the insufficient spread of the ink when the recording is performed on the regular paper, for example, even in the case of the use for an ink-jet printer which mounts a stacked type printer head having a narrow and complicated ink flow passage formed therein by allowing the water base ink for ink-jet recording to contain at least the dispersible coloring agent, the propylene glycol ether, and the surfactant represented by the general formula (1), (2), or (3) described above. Thus, the present invention has been completed.

The water base ink for ink-jet recording of the present invention contains the dispersible coloring agent. The term "dispersible coloring agent" herein refers to the coloring agent which is dispersible in the water phase or aqueous phase. The dispersible coloring agent is not limited, which includes, for example, carbon black as well as many inorganic pigments and organic pigments. The inorganic pigment may include, for example, titanium oxide and iron oxide. The organic pigment may include, for example, azo pigments such as azo lake, insoluble azo pigment, condensed azo pigment, and chelate azo pigment; polycyclic pigments such as phthalocyanine pigment, perylene pigment, perynone pigment, anthraquinone pigment, quinacridone pigment, dioxazine pigment, thioindigo pigment, isoindolinone pigment, and quinophthalone pigment; dye lakes such as basic dye type lake and acidic dye type lake; nitro pigments; nitroso pigments; and aniline black daylight fluorescent pigments. Other pigments are also usable provided that they are dispersible in the aqueous phase. Further, coloring agents, which are obtained by staining polymers with dyes, are equivalently usable as well. The dispersible coloring agent may be used singly. Alternatively, two or more of the dispersible coloring agents may be used in combination. The dispersible coloring agent is used for the water base ink for ink-jet recording of the present invention in order to avoid the feathering more effectively. If the dye, which is dissolved in the aqueous phase, is used as the coloring agent, the feathering tends to occur due to the high fluidity. However, the effect to suppress the feathering is enhanced, because the solid matter of the dispersible coloring agent has a low fluidity as compared with the solution.

In the water base ink for ink-jet recording of the present invention, the content of the dispersible coloring agent is preferably 0.1 to 20% by weight, more preferably 0.3 to 15% by weight, and much more preferably 0.5 to 10% by weight.

The water base ink for ink-jet recording of the present invention contains the propylene glycol ether. The propylene glycol ether includes the skeleton of $(CHCH_3CH_2O)$ as the lipophilic component in its molecular structure, and hence the permeability into the paper is excellent. Therefore, even when the propylene glycol ether is added in a small amount, the effect is sufficiently exhibited. It is possible to prevent from the insufficient spread of the ink without causing the feathering of the ink on the recording paper.

The propylene glycol ether may include, for example, propylene glycol monomethyl ether, dipropylene glycol monomethyl ether, tripropylene glycol monomethyl ether, propylene glycol monopropyl ether, dipropylene glycol monopropyl ether, propylene glycol monobutyl ether, dipropylene glycol monobutyl ether, tripropylene glycol normal butyl ether, propylene glycol monophenyl ether, and dipropylene glycol dimethyl ether. The propylene glycol ether, which is usable in the water base ink for ink-jet recording of the present invention, is not limited thereto.

The content of the propylene glycol ether is preferably 0.01 to 10% by weight with respect to the total amount of the ink. If the content is less than 0.01% by weight, then the permeation speed of the ink into the recording paper is slow, and any problem arises in relation to the drying time and the spread of the ink in some cases. If the content exceeds 10% by weight, the degree of permeation of the ink into the recording paper is excessively increased. As a result, the ink arrives at the back of the recording paper in some cases, and the feathering is caused in other cases. The content is more preferably 0.1 to 3% by weight. Especially, the content is much more preferably 2% by weight to 3% by weight.

The water base ink for ink-jet recording according to the first aspect of the present invention contains the surfactant composed of the random copolymer represented by the general formula (1) described above. In the surfactant composed of the random copolymer represented by the general formula (1), the ratio between the proportion of the $(CH_2CH_2O)$ chain and the proportion of the $(CHCH_3CH_2O)$ chain is identical on account of the chemical structure thereof. Therefore, the balance between the hydrophilic group and the lipophilic group is excellent. The surfactant also possesses the defoaming effect while possessing the surface-active function. That is, if the proportion of the $(CH_2CH_2O)$ chain is increased, the ink tends to be foamed, while if the proportion of the $(CHCH_3CH_2O)$ chain is increased, the feathering tends to be caused. The surfactant, which is composed of the random copolymer represented by the general formula (1), has the alkyl group having a number carbon atoms of 3 to 5 at the terminal of the molecule. If the number of carbon atoms of the alkyl group is less than 3, or if the number of carbon atoms exceeds 5, then the balance between the hydrophilic group and the lipophilic group is collapsed, and it is impossible to sufficiently exhibit the effect as described above.

Therefore, the surfactant, which is composed of the random copolymer represented by the general formula (1) described above, improves the wettability between the ink and the ink flow passage of the stacked type printer head owing to the surface-active function, making it possible to smoothly introduce the ink into the ink flow passage. On the other hand, owing to the defoaming function of the surfactant, the bubbles or foams can be quickly broken, even when the bubbles or foams are generated in the ink flow passage of the stacked type printer head or the bubbles or foams are allowed to flow thereinto. The surfactant has the function to prevent the bubbles or foams from causing any clog-up. Therefore, it is considered that the surfactant has the effect to discharge the ink stably. As appreciated from Example A's described later on, the present inventors have found out the fact that the initial introduction performance of the ink is successfully improved without deteriorating the effects possessed by the propylene glycol ether to avoid the occurrence of the feathering and dissolve the insufficient spread of the ink by using the surfactant represented by the general formula (1) in combination with the propylene glycol ether described above. That is, the present inventors have succeeded in satisfying the three requirements as the object of the present invention by combining the surfactant represented by the general formula (1) with the propylene glycol ether.

Those commercially available of the surfactant composed of the random copolymer represented by the general formula (1) may include, for example, LEOCON (trade name) produced by Lion Corporation.

The content of the surfactant composed of the random copolymer represented by the general formula (1) is preferably 0.01 to 10% by weight in the water base ink. If the content is less than 0.01% by weight, then the defoaming effect of the water base ink for ink-jet recording of the present invention is insufficient, and the initial introduction performance of the ink is deteriorated. On the other hand, if the content exceeds 10% by weight, the degree of permeation of the ink into the recording paper is excessively increased. In this case, for example, inconveniences arise such that any harmful influence is exerted on the printing quality, and the surroundings of the nozzle of the printer head are extremely wetted by the ink. As a result, the ink is hardly discharged in a stable manner in some cases. More preferably, the content is 0.1 to 3% by weight. According to Example A's as described later on, it has been revealed that the weight ratio of use of the surfactant represented by the general formula (1) with respect to the propylene glycol ether preferably satisfies propylene glycol ether:surfactant=1:0.5 to 2:0.3 (a content ratio by weight of propylene glycol ether/surfactant is 2 to 6.7).

The water base ink for ink-jet recording according to the second aspect contains the surfactant composed of the block copolymer represented by the general formula (2) described above. The surfactant composed of the block copolymer represented by the general formula (2) simultaneously possesses the defoaming effect while possessing the surface-active function, probably for the following reason. That is, it is considered that the ratio of the ($CH_2CH_2O$) chain, which occupies the average molecular weight, is 40 to 50% (the weight ratio between $CH_2CH_2O$ and $CHCH_3CH_2O$ in the molecule satisfies ($CH_2CH_2O$:$CHCH_3CH_2O$)=40% by weight:60% by weight to 50% by weight:50% by weight), in which the balance is excellent between the hydrophilicity of the ($CH_2CH_2O$) chain and the lipophilicity of the ($CHCH_3CH_2O$) chain. If the amount of the ($CH_2CH_2O$) chain is increased, i.e., if n exceeds 24, then the ink tends to be foamed. On the other hand, if the amount of the ($CHCH_3CH_2O$) chain is increased, i.e., if m exceeds 36, then the feathering tends to be caused. On the other hand, it is considered that if n is less then 13 or if m is less than 30, then the function of the surfactant is weakened.

Therefore, the surfactant, which is composed of the block copolymer represented by the general formula (2) described above, improves the wettability between the ink and the ink flow passage of the stacked type printer head owing to the surface-active function, making it possible to smoothly introduce the ink into the ink flow passage. On the other hand, owing to the defoaming function of the surfactant, the bubbles or foams can be quickly broken, even when the bubbles or foams are generated in the ink flow passage of the stacked type printer head or the bubbles or foams are allowed to flow thereinto. The surfactant has the function to prevent the bubbles or foams from causing any clog-up. Therefore, it is considered that the surfactant has the effect to discharge the ink stably.

Those commercially available of the surfactant composed of the block copolymer represented by the general formula (2) may include, for example, NEWPOL PE64 produced by Sanyo Chemical Industries, Ltd. (m=30 to 31, n=13 to 14, overall average molecular weight: 2,940 to 2,950, weight ratio between $CH_2CH_2O$ and $CHCH_3CH_2O$ in the molecule ($CH_2CH_2O$:$CHCH_3CH_2O$)=40% by weight:60% by weight), NEWPOL PE74 (m=35 to 36, n=15 to 16, overall average molecular weight: 3,440 to 3,450, weight ratio between $CH_2CH_2O$ and $CHCH_3CH_2O$ in the molecule ($CH_2CH_2O$:$CHCH_3CH_2O$)=40% by weight:60% by weight), and NEWPOL PE75 (m=35 to 36, n=23 to 24, overall average molecular weight: 4,130 to 4,140, weight ratio between $CH_2CH_2O$ and $CHCH_3CH_2O$ in the molecule ($CH_2CH_2O$:$CHCH_3CH_2O$)=50% by weight:50% by weight).

As for the blending amount of the surfactant composed of the block copolymer represented by the general formula (2) with respect to the total amount of the water base ink, the lower limit is preferably 0.01% by weight, and the upper limit is 10% by weight. More preferably, the lower limit is 0.1% by weight, and the upper limit is 3% by weight. If the blending amount is less than 0.01% by weight, then the defoaming effect of the ink is insufficient, and the initial introduction performance into the ink flow passage of the printer head is deteriorated in some cases. If the blending amount exceeds 10% by weight, the degree of permeation of the ink into the recording paper is excessively increased. In this case, for example, inconveniences arise such that any harmful influence is exerted on the printing quality, and the surroundings of the nozzle of the printer head are extremely wetted by the ink. As a result, the ink is hardly discharged in a stable manner in some cases. According to Example B's as described later on, it has been revealed that the weight ratio of use of the surfactant represented by the general formula (2) with respect to the propylene glycol ether preferably satisfies propylene glycol ether:surfactant=1:0.5 to 2:0.3 (a content ratio by weight of propylene glycol ether/surfactant is 2 to 6.7).

The water base ink for ink-jet recording according to the third aspect of the present invention contains the surfactant represented by the general formula (3) described above. The surfactant represented by the general formula (3) has the effect to enhance the wettability with respect to the material for constructing the ink flow passage of the printer head, especially the metal material such as Ni alloy. Therefore, it is considered that the ink can be smoothly introduced into the ink flow passage even when the printer head is the stacked type printer head in which the narrow ink flow passage having the complicated structure is formed therein. Even when the bubbles or foams are generated in the ink flow passage of the printer head, the function is effected such that the bubbles or foams can be quickly released to the outside of the ink flow passage to prevent the bubbles or foams from causing any clog-up. Therefore, it is considered that the effect is obtained to stably discharge the ink.

If n is smaller than 2 in the general formula (3), the versatile applicability is deficient, because the solubility in water is lowered. If n is larger than 4, then the hydrophilicity is increased, the wettability with respect to the metal material is deteriorated, and the discharge stability is consequently deteriorated. If the number of carbon atoms of the alkyl group of the general formula (3) is smaller than 12, then the hydrophilicity is increased, the wettability with respect to the metal material is deteriorated, and the discharge stability is consequently deteriorated. If the number of carbon atoms of the alkyl group is larger than 15, the versatile applicability is deficient, because the solubility in water is lowered.

Those commercially available of the surfactant represented by the general formula (3) may include, for example, SANDET END produced by Sanyo Chemical Industries, Ltd. (alkyl group: number of carbon atoms: 12 to 15, number of moles of addition of ethylene oxide: 3, counterion: Na), SANDET EN (alkyl group: number of carbon atoms: 12, number of moles of addition of ethylene oxide: 2, counterion: Na), SANDET ET (alkyl group: number of carbon atoms: 12, number of moles of addition of ethylene oxide: 4, counterion: triethanolamine), EMAL 20T produced by Kao Corporation (alkyl group: number of carbon atoms: 12, number of moles of addition of ethylene oxide: 3, counterion: triethanolamine), and EMAL 20C (alkyl group: number of carbon atoms: 12, number of moles of addition of ethylene oxide: 3, counterion: Na).

As for the blending amount of the surfactant represented by the general formula (3) with respect to the total amount of the ink, the lower limit is preferably 0.01% by weight, and the upper limit is 10% by weight. More preferably, the lower limit is 0.1% by weight, and the upper limit is 3% by weight. If the blending amount is less than 0.01% by weight, then the wettability with respect to the ink flow passage of the printer head is lowered, and the initial introduction performance is deteriorated in some cases. If the blending amount exceeds 10% by weight, the degree of permeation of the ink into the recording paper is excessively increased. In this case, for example, inconveniences arise such that any harmful influence is exerted on the printing quality, and the surroundings of the nozzle of the printer head are extremely wetted by the water base ink for ink-jet recording of the present invention. As a result, the ink is hardly discharged in a stable manner in some cases. According to Example C's as described later on, it has been revealed that the weight ratio of use of the surfactant represented by the general formula (3) with respect to the propylene glycol ether preferably satisfies propylene glycol ether:surfactant=1:0.2 to 2:0.2 (a content ratio by weight of propylene glycol ether/surfactant is 5 to 10).

The water base ink for ink-jet recording of the present invention contains water in addition to the dispersible coloring agent, the propylene glycol ether, and the surfactant as described above. As for the water, it is preferable to use those having high purities such as ion exchange water and distilled water other than ordinary water. The content of water is preferably 10 to 98% by weight with respect to the total weight of the ink. The content is more preferably 30 to 97% by weight and much more preferably 40 to 95% by weight.

The water base ink for ink-jet recording of the present invention is basically constructed as described above. Other than the above, it is also possible to add, if necessary, conventionally known various dispersing agents, viscosity-adjusting agents, surface tension-adjusting agents, pH-adjusting agents, and antiseptic/fungicidal agents.

The water base ink for ink-jet recording of the present invention may contain the following materials in order to improve the liquid stability thereof. The liquid stability refers to the provision of the (moistening) effect to prevent the water base ink for ink-jet recording of the present invention from being dried at the nozzle of the printer head.

The substance to improve the liquid stability is not specifically limited, which may include, for example, polyvalent alcohols such as ethylene glycol, diethylene glycol, triethylene glycol, polyethylene glycol, 1,3-butanediol, 1,5-pentanediol, 1,6-hexanediol, glycerol, 1,2,6-hexanetriol, 1,2,4-butanetriol, and 1,2,3-butanetriol;

nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide;

amines such as monoethanolamine, diethanolamine, triethanolamine, monoethylamine, diethylamine, and triethylamine; and sulfur-containing compounds such as dimethylsulfoxide, sulfolane, and thiodiethanol. The substance to improve the liquid stability as described above may be used singly. Alternatively, two or more of the substances to improve the liquid stability as described above may be used in combination. The content of the substance to improve the liquid stability in the water base ink for ink-jet recording of the present invention is determined in a wide range depending on desired characteristics and compositions of the water base ink for ink-jet recording of the present invention. However, in general, the content is preferably 0 to 40% by weight and more preferably, 5 to 30% by weight.

The water base ink for ink-jet recording of the present invention can be used for ink-jet printers which mount various types of printer heads. In particular, the water base ink for ink-jet recording of the present invention can be preferably used for a piezoelectric ink-jet printer which carries a stacked type printer head in which narrow ink flow passages each having a complicated structure are formed.

Figure 1:
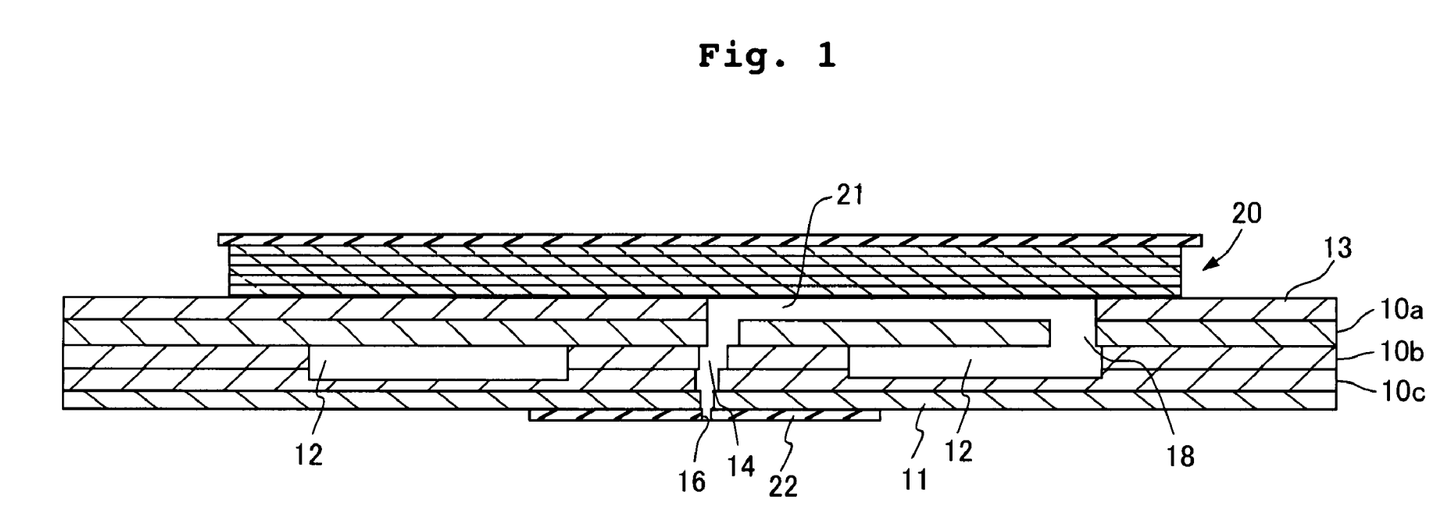
FIG. 1 shows a magnified sectional view illustrating a stacked type printer head.

FIG. 1 shows a magnified sectional view illustrating the stacked type printer head. As shown in FIG. 1, the stacked type printer head is constructed such that a piezoelectric actuator 20, which is formed by alternately stacking electrodes and piezoelectric material layers, is joined on a stack in which a plurality of stacked sheets (Ni—Fe alloy) 10a, 10b, 10c, 11, 13 of about 50 to 150 μm are stacked and adhered to one another. Ink flow passages 14, which are formed by mutually communicating openings formed in the respective stacked sheets, for example, by performing the etching, are formed in the stack. A plurality of ink chambers 21 are formed in the stacked sheet 13 disposed at the uppermost layer. Openings 18 are formed in the stacked sheet 10a disposed at the second layer from the top. A common ink chamber 12 is formed in the stacked sheets 10b, 10c disposed at the third and fourth layers from the top. A nozzle plate 22, which has nozzle holes 16, is adhered to the lower surface of the stacked sheet 11 disposed at the lowermost layer.

In the stacked type printer head having the structure as described above, the water base ink for ink-jet recording is introduced from the ink cartridge into the common ink chamber 12, the openings 18, and the plurality of ink chambers 21 in this order. When the pressure is applied by the piezoelectric actuator 20 to the water base ink for ink-jet recording contained in the ink chamber 21, the water base ink for ink-jet recording is discharged from the nozzle hole 16 via the ink flow passages 14 (14a, 14b, 14c as shown in FIG. 2) bored through the stacked sheets 10a, 10b, 10c. The ink flow passages 14 are constructed as follows in order to supply the water base ink for ink-jet recording to the nozzle holes 16 disposed at the positions separated from the ink chambers 21. That is, the openings, which are formed in the respective stacked sheets 10a, 10b, 10c, 11, are deviated in a stepped manner as in the ink flow passages 14a, 14b, 14c shown in FIG. 2. Bent sections or the like are formed as well in the ink flow passages in relation to the common ink chamber 12, the openings 18, and the ink chambers 21 in the same manner as described above.

EXAMPLES

The present invention will be explained in further detail below as exemplified by Examples. However, the present invention is not limited to only Examples. Ink compositions according to the present invention are shown below as Examples. Example A's to Example C's are illustrative of working examples of the inks according to the first to third aspects of the present invention. Comparative Example A's to Comparative Example C's are illustrative of comparative examples corresponding to Example A's to Example C's.

The present invention is not limited to Examples. The present invention can be also carried out even when the material substances, the amounts thereof, and the manufacturing conditions are changed within the ranges described above.

Example A

Example A1

A water base ink for ink-jet recording having a composition shown in Table A1 was prepared by using pure water, CAB-O-JET 300 black (produced by Cabot) as a dispersible coloring agent, dipropylene glycol monopropyl ether (abbreviated as "DPP" in this case and in the following cases as well) as a propylene glycol ether, and a surfactant composed of a random copolymer represented by the general formula (1) described above provided that $R=C_4H_9$ and n=m=about 50 were satisfied.

TABLE A1

| Example A1 | % by weight |
|---|---|
| Pure water | 39.2 |
| CAB-O-JET 300 Black | 33.3 |
| DPP | 2 |
| Surfactant represented by general formula (1), $R = C_4H_9$, n = m = about 50 | 0.5 |
| Glycerol | 25 |

Example A2

A water base ink for ink-jet recording having a composition shown in Table A2 was prepared in the same manner as in Example A1 except for the use of a surfactant composed of a random copolymer represented by the general formula (1) described above provided that $R=C_3H_7$ and n=m=about 50 were satisfied.

TABLE A2

| Example A2 | % by weight |
|---|---|
| Pure water | 39.2 |
| CAB-O-JET 300 Black | 33.3 |
| DPP | 2 |
| Surfactant represented by general formula (1), $R = C_3H_7$, n = m = about 50 | 0.5 |
| Glycerol | 25 |

Example A3

A water base ink for ink-jet recording having a composition shown in Table A3 was prepared in the same manner as in Example A1 except for the use of a surfactant composed of a random copolymer represented by the general formula (1) described above provided that $R=C_5H_{11}$ and n=m=about 50 were satisfied.

TABLE A3

| Example A3 | % by weight |
|---|---|
| Pure water | 39.2 |
| CAB-O-JET 300 Black | 33.3 |
| DPP | 2 |
| Surfactant represented by general formula (1), $R = C_5H_{11}$, n = m = about 50 | 0.5 |
| Glycerol | 25 |

Example A4

A water base ink for ink-jet recording having a composition shown in Table A4 was prepared in the same manner as in Example A1 except that tripropylene glycol normal butyl ether (abbreviated as "TPnB") was used as a propylene glycol ether.

TABLE A4

| Example A4 | % by weight |
|---|---|
| Pure water | 40.2 |
| CAB-O-JET 300 Black | 33.3 |
| TPnB | 1 |
| Surfactant represented by general formula (1), $R = C_4H_9$, n = m = about 50 | 0.5 |
| Glycerol | 25 |

Example A5

A water base ink for ink-jet recording having a composition shown in Table A5 was prepared in the same manner as in Example A1 except that dipropylene glycol monobutyl ether (abbreviated as "DPGBE") was used as a propylene glycol ether.

TABLE A5

| Example A5 | % by weight |
|---|---|
| Pure water | 40.2 |
| CAB-O-JET 300 Black | 33.3 |
| DPGBE | 1 |
| Surfactant represented by general formula (1), $R = C_4H_9$, n = m = about 50 | 0.5 |
| Glycerol | 25 |

Example A6

A water base ink for ink-jet recording having a composition shown in Table A6 was prepared in the same manner as in Example A1 except that the content of DPP was 1.0% by weight and the content of pure water was 40.2% by weight.

TABLE A6

| Example A6 | % by weight |
|---|---|
| Pure water | 40.2 |
| CAB-O-JET 300 Black | 33.3 |
| DPP | 1 |
| Surfactant represented by general formula (1), R = $C_4H_9$, n = m = about 50 | 0.5 |
| Glycerol | 25 |

Example A7

A water base ink for ink-jet recording having a composition shown in Table A7 was prepared in the same manner as in Example A1 except that the content of the surfactant composed of the random copolymer represented by the general formula (1) described above was 0.3% by weight and the content of pure water was 39.4% by weight.

TABLE A7

| Example A7 | % by weight |
|---|---|
| Pure water | 39.4 |
| CAB-O-JET 300 Black | 33.3 |
| DPP | 2 |
| Surfactant represented by general formula (1), R = $C_4H_9$, n = m = about 50 | 0.3 |
| Glycerol | 25 |

Comparative Example A1

A water base ink for ink-jet recording having a composition shown in Table A8 was prepared by using pure water, CAB-O-JET 300 black (produced by Cabot) as a dispersible coloring agent, and DPP as a propylene glycol ether without using the surfactant composed of the random copolymer represented by the general formula (1) described above.

TABLE A8

| Comparative Example A1 | % by weight |
|---|---|
| Pure water | 38.7 |
| CAB-O-JET 300 Black | 33.3 |
| DPP | 2 |
| Glycerol | 26 |

Comparative Example A2

A water base ink for ink-jet recording having a composition shown in Table A9 was prepared by using pure water, CAB-O-JET 300 black (produced by Cabot) as a dispersible coloring agent, and a surfactant composed of a random copolymer represented by the general formula (1) described above provided that R=$C_4H_9$ and n=m=about 50 were satisfied, without using the propylene glycol ether.

TABLE A9

| Comparative Example A2 | % by weight |
|---|---|
| Pure water | 39.2 |
| CAB-O-JET 300 Black | 33.3 |
| Surfactant represented by general formula (1), R = $C_4H_9$, n = m = about 50 | 0.5 |
| Glycerol | 27 |

Comparative Example A3

A water base ink for ink-jet recording having a composition shown in Table A10 was prepared in the same manner as in Example A1 except that triethylene glycol butyl ether (BTG) was used in place of dipropylene glycol propyl ether (DPP).

TABLE A10

| Comparative Example A3 | % by weight |
|---|---|
| Pure water | 39.2 |
| CAB-O-JET 300 Black | 33.3 |
| BTG | 2 |
| Surfactant represented by general formula (1), R = $C_4H_9$, n = m = about 50 | 0.5 |
| Glycerol | 25 |

Comparative Example A4

A water base ink for ink-jet recording having a composition shown in Table A11 was prepared in the same manner as in Example A1 except that a surfactant represented by the following general formula (4) was used in place of the surfactant composed of the random copolymer represented by the general formula (1) described above.

$$R\text{---}O\text{---}((CH_2CH_2O)_{12})\text{---}H \tag{4}$$

In the general formula (4), R represents an alkyl group having a number of carbon atoms of 14 to 15.

TABLE A11

| Comparative Example A4 | % by weight |
|---|---|
| Pure water | 39.2 |
| CAB-O-JET 300 Black | 33.3 |
| DPP | 2 |
| Surfactant represented by general formula (4), R = alkyl group having a number of C's of 14 to 15 | 0.5 |
| Glycerol | 25 |

Comparative Example A5

An ink having a composition shown in Table A12 was prepared by using pure water, a dye (C. I. Direct Black 17), DPP as the propylene glycol ether, and a surfactant composed of a random copolymer represented by the general formula (1) described above provided that R=$C_4H_9$ and n=m=about 50 were satisfied.

TABLE A12

| Comparative Example A5 | % by weight |
|---|---|
| Pure water | 69.5 |
| C. I. Direct Black 17 | 3 |
| DPP | 2 |
| Surfactant represented by general formula (1) , R = $C_4H_9$, n = m = about 50 | 0.5 |
| Glycerol | 25 |

Evaluation

The viscosity and the surface tension were measured in order to use them as criteria for the initial introduction performance into the printer head in relation to the water base inks for ink-jet recording prepared in Examples A1 to A7 and Comparative Examples A1 to A5. The evaluation was made in accordance with the following methods for the foaming power, the foam stability, the ink introduction performance, the feathering, the ink spread, and the overall ink evaluation of each of the obtained water base inks for ink-jet recording. When the evaluation was made for the ink introduction performance, the feathering, and the ink spread, a vacuum state is established in an ink container by using a vacuum pump while applying the ultrasonic wave to the water base ink for ink-jet recording prepared in each of Examples A1 to A7 and Comparative Examples A1 to A5 to use the water base ink for ink-jet recording obtained thereby for the recording evaluation in which the gas contained in the ink was degassed or eliminated. The recording was performed by using the obtained water base inks for ink-jet recording for the recording evaluation in relation to Example A's and Comparative Example A's respectively with a piezoelectric ink-jet printer (produced by Brother Industries, Ltd., MFC 3100C) which carried a stacked type printer head (see FIG. 1) manufactured by stacking sheets formed with parts of ink flow passages. Obtained results are shown in Tables A13 and A14.

(1) Foaming Power of Ink and Foam Stability

The foaming power and the foam stability were measured on the basis of the test method for the foaming power and the foam stability of JIS K 3362 (1998) to evaluate the defoaming performance. The water base ink for ink-jet recording, in which the defoaming performance is excellent, is the ink in which the difference between the foaming power and the foam stability is large. Further, the defoaming performance is evaluated by a ratio of the foam stability to foaming power regardless of the value of the foaming power. On the other hand, the initial introduction performance of the ink is satisfactory when the contact angle is low between the ink and the member for constructing the ink flow passage of the ink-jet printer head. The contact angle generally correlates to the surface tension of the ink. In order to improve the initial introduction performance, it is preferable that the surface tension of the ink is not more than 40 mN/m and the foam stability/foaming power is not more than 0.5.

(2) Ink Introduction Performance

The purge (suction of the ink with the pump of the main printer body) was performed three times after exchanging the ink cartridge, and the evaluation was directed to the ratio of the discharge nozzles with respect to the total number of nozzles. The evaluation criteria are as follows.

++: The ratio of the discharge nozzles with respect to the total number of nozzles was 100% after performing the purge three times.

+: The ratio of the discharge nozzles with respect to the total number of nozzles was not less than 95% after performing the purge three times.

±: The ratio of the discharge nozzles with respect to the total number of nozzles was not less than 90% after performing the purge three times.

−: The ratio of the discharge nozzles with respect to the total number of nozzles was less than 90% after performing the purge three times.

(3) Feathering

An image sample was recorded to evaluate whether or not the feathering was caused. The image sample was composed of a portion which included only single color letters without any background and a portion which included single color solid printing. The evaluation was directed to the distinction of letters and the disturbance or disorder of lines caused by the blurring of the ink. As for the size of the recorded letters, the letter size was set to 11 Point by using Microsoft Word 97 to perform the recording by using regular paper (Xerox 4200). The evaluation criteria are as follows.

++: The feathering is scarcely caused, and the letters are vivid.

+: The feathering is slightly caused, but the letters are sufficiently readable or distinguishable.

±: The feathering is clearly caused, but the letters are readable or distinguishable.

−: The feathering is clearly caused on straight lines, and the letters are indistinct as well.

(4) Spread of Ink

The image sample, which was recorded in the item of "(3) Feathering", was evaluated for the spread of the ink. The evaluation criteria are as follows.

++: The insufficient spread of the ink is scarcely caused, and no gap is observed between ink portions of the solid printing portion.

+: The insufficient spread of the ink is caused a little, but the gap is scarcely observed between ink portions when the observation is performed in a macroscopic manner.

±: The insufficient spread is caused a little, and the gap is slightly observed between ink portions when the observation is performed in a macroscopic manner.

−: The insufficient spread is clearly caused, and the gap is conspicuous between ink portions as well when the observation is performed in a macroscopic manner.

(5) Overall Evaluation

The worst evaluation of those of the ink introduction performance, the feathering, and the ink spread was designated as the overall evaluation of the ink. For example, when the evaluation of the ink introduction performance is "−", the evaluation of the feathering is "++", and the evaluation of the ink spread is "++", then the overall evaluation is "−", because the ink introduction performance is extremely unsatisfactory even when the printing quality is extremely satisfactory.

TABLE A13

Evaluation Results of Examples

| | Ex. A1 | Ex. A2 | Ex. A3 | Ex. A4 | Ex. A5 | Ex. A6 | Ex. A7 |
|---|---|---|---|---|---|---|---|
| Viscosity (mPa·s) | 3.0 | 3.0 | 3.0 | 2.9 | 2.9 | 2.9 | 3.0 |
| Surface tension (mN/m) | 37.0 | 38.0 | 36.0 | 35.0 | 35.0 | 39.0 | 39.0 |
| Foaming power A (mm) | 110 | 100 | 100 | 85 | 110 | 90 | 100 |
| Foam stability B (mm) | 20 | 25 | 30 | 30 | 40 | 30 | 40 |
| B/A | 0.2 | 0.3 | 0.3 | 0.4 | 0.4 | 0.3 | 0.4 |
| Ink introduction performance, discharge stability | ++ | ++ | ++ | ++ | ++ | ++ | + |
| Feathering | ++ | ++ | ++ | ++ | ++ | ++ | ++ |
| Ink spread | ++ | ++ | ++ | + | + | + | + |
| Overall evaluation | ++ | ++ | ++ | + | + | + | + |

TABLE A14

Evaluation Results of Comparative Examples

| | Comp. Ex. A1 | Comp. Ex. A2 | Comp. Ex. A3 | Comp. Ex. A4 | Comp. Ex. A5 |
|---|---|---|---|---|---|
| Viscosity (mPa·s) | 2.9 | 2.9 | 3.0 | 3.0 | 3.1 |
| Surface tension (mN/m) | 42.0 | 39.0 | 39.0 | 35.0 | 35.0 |
| Foaming power A (mm) | 90 | 90 | 100 | 190 | 100 |

TABLE A14-continued

Evaluation Results of Comparative Examples

|  | Comp. Ex. A1 | Comp. Ex. A2 | Comp. Ex. A3 | Comp. Ex. A4 | Comp. Ex. A5 |
|---|---|---|---|---|---|
| Foam stability B (mm) | 0 | 50 | 60 | 170 | 0 |
| B/A | 0.0 | 0.6 | 0.6 | 0.9 | 0.0 |
| Ink introduction performance, discharge stability | − | + | + | − | ++ |
| Feathering | ++ | ++ | ± | ± | ± |
| Ink spread | ± | − | ++ | + | ++ |
| Overall evaluation | − | − | ± | − | ± |

As shown in Table A13, in the case of the water base inks for ink-jet recording prepared in Example A's, the ink introduction performance was satisfactory, and the satisfactory recording was successfully performed, in which the feathering of the ink and the insufficient spread of the ink were reduced on the recording paper.

On the other hand, as shown in Table A14, in the case of the water base inks for ink-jet recording prepared in Comparative Example A's, the ink introduction performance was unsatisfactory, and/or the feathering or the insufficient spread of the ink was clearly caused. It was impossible to obtain any sufficient printing quality, and it was impossible to obtain any satisfactory result. In Comparative Example A1, the numerical value of the foam stability/foaming power is zero, and the composition apparently has any satisfactory ink introduction performance. However, the surface tension is high, i.e., not less than 40 mN/M, because no surfactant is added. The wettability is low with respect to the member for constructing the ink flow passage of the stacked type printer head. It was impossible for the ink to smoothly enter the ink flow passage of the stacked type printer head, resulting in the result in which the initial introduction performance was unsatisfactory.

According to the facts described above, the following fact has been successfully confirmed. That is, the effect to be obtained is inferior even when each of the dispersible coloring agent, the propylene glycol ether, and the surfactant composed of the random copolymer represented by the general formula (1) described above is used singly. When the dispersible coloring agent, the propylene glycol ether, and the surfactant composed of the random copolymer represented by the general formula (1) described above are used in combination, the water base ink for ink-jet recording is obtained, which satisfies the three requirements as the object of the present invention, i.e., the initial introduction performance of the ink into the ink-jet printer head is satisfactory, the feathering is not caused on the recording paper, and the insufficient spread of the ink is successfully reduced.

Example B

Example B1

A water base ink for ink-jet recording having a composition shown in Table B1 was prepared by using pure water, CAB-O-JET 300 black (produced by Cabot) as a dispersible coloring agent, dipropylene glycol propyl ether (DPP) as a propylene glycol ether, NEWPOL PE64 (produced by Sanyo Chemical Industries, Ltd., m=30 to 31, n=13 to 14, total average molecular weight: 2,940 to 2,950) as a surfactant composed of a block copylymer represented by the general formula (2) described above, and glycerol as a moistening agent.

TABLE B1

| Example B1 | % by weight |
|---|---|
| Pure water | 39.2 |
| CAB-O-JET 300 Black | 33.3 |
| DPP | 2 |
| NEWPOL PE64 | 0.5 |
| Glycerol | 25 |

Example B2

A water base ink for ink-jet recording having a composition shown in Table B2 was prepared in the same manner as in Example B1 except that NEWPOL PE74 (produced by Sanyo Chemical Industries, Ltd., m=35 to 36, n=15 to 16, total average molecular weight: 3,440 to 3,450) was used as a surfactant composed of a block copolymer represented by the general formula (2) described above.

TABLE B2

| Example B2 | % by weight |
|---|---|
| Pure water | 39.2 |
| CAB-O-JET 300 Black | 33.3 |
| DPP | 2 |
| NEWPOL PE74 | 0.5 |
| Glycerol | 25 |

Example B3

A water base ink for ink-jet recording having a composition shown in Table B3 was prepared in the same manner as in Example B1 except that NEWPOL PE75 (produced by Sanyo Chemical Industries, Ltd., m=35 to 36, n=23 to 24, total average molecular weight: 4,130 to 4,140) was used as a surfactant composed of a block copolymer represented by the general formula (2) described above.

TABLE B3

| Example B3 | % by weight |
|---|---|
| Pure water | 39.2 |
| CAB-O-JET 300 Black | 33.3 |
| DPP | 2 |
| NEWPOL PE75 | 0.5 |
| Glycerol | 25 |

Example B4

A water base ink for ink-jet recording having a composition shown in Table B4 was prepared in the same manner as in Example B1 except that tripropylene glycol normal butyl ether (TPnB) was used as a propylene glycol ether.

TABLE B4

| Example B4 | % by weight |
|---|---|
| Pure water | 40.2 |
| CAB-O-JET 300 Black | 33.3 |
| TPnB | 1 |

TABLE B4-continued

| Example B4 | % by weight |
|---|---|
| NEWPOL PE64 | 0.5 |
| Glycerol | 25 |

Example B5

A water base ink for ink-jet recording having a composition shown in Table B5 was prepared in the same manner as in Example B1 except that dipropylene glycol monobutyl ether (DPGBE) was used as a propylene glycol ether.

TABLE B5

| Example B5 | % by weight |
|---|---|
| Pure water | 40.2 |
| CAB-O-JET 300 Black | 33.3 |
| DPGBE | 1 |
| NEWPOL PE64 | 0.5 |
| Glycerol | 25 |

Example B6

A water base ink for ink-jet recording having a composition shown in Table B6 was prepared in the same manner as in Example B1 except that the blending amount of dipropylene glycol propyl ether (DPP) was changed.

TABLE B6

| Example B6 | % by weight |
|---|---|
| Pure water | 40.2 |
| CAB-O-JET 300 Black | 33.3 |
| DPP | 1 |
| NEWPOL PE64 | 0.5 |
| Glycerol | 25 |

Example B7

A water base ink for ink-jet recording having a composition shown in Table B7 was prepared in the same manner as in Example B1 except that the blending amount of the surfactant composed of the block copolymer represented by the general formula (2) was changed.

TABLE B7

| Example B7 | % by weight |
|---|---|
| Pure water | 39.4 |
| CAB-O-JET 300 Black | 33.3 |
| DPP | 2 |
| NEWPOL PE64 | 0.3 |
| Glycerol | 25 |

Comparative Example B1

A water base ink for ink-jet recording having a composition shown in Table B8 was prepared by using pure water, CAB-O-JET 300 black (produced by Cabot) as a dispersible coloring agent, dipropylene glycol propyl ether (DPP) as a propylene glycol ether, and glycerol as a moistening agent.

TABLE B8

| Comparative Example B1 | % by weight |
|---|---|
| Pure water | 38.7 |
| CAB-O-JET 300 Black | 33.3 |
| DPP | 2 |
| Glycerol | 26 |

Comparative Example B2

A water base ink for ink-jet recording having a composition shown in Table B9 was prepared by using pure water, CAB-O-JET 300 black (produced by Cabot) as a dispersible coloring agent, NEWPOL PE64 (produced by Sanyo Chemical Industries, Ltd., m=30 to 31, n=13 to 14, total average molecular weight: 2,940 to 2,950) as a surfactant composed of a block copolymer represented by the general formula (2) described above, and glycerol as a moistening agent.

TABLE B9

| Comparative Example B2 | % by weight |
|---|---|
| Pure water | 39.2 |
| CAB-O-JET 300 Black | 33.3 |
| NEWPOL PE64 | 0.5 |
| Glycerol | 27 |

Comparative Example B3

A water base ink for ink-jet recording having a composition shown in Table B10 was prepared in the same manner as in Example B1 except that triethylene glycol butyl ether (BTG) was used in place of dipropylene glycol propyl ether (DPP).

TABLE B10

| Comparative Example B3 | % by weight |
|---|---|
| Pure water | 39.2 |
| CAB-O-JET 300 Black | 33.3 |
| BTG | 2 |
| NEWPOL PE64 | 0.5 |
| Glycerol | 25 |

Comparative Example B4

A water base ink for ink-jet recording having a composition shown in Table B11 was prepared in the same manner as in Example B1 except that a surfactant represented by the following general formula (5) was used in place of the surfactant composed of the block copolymer represented by the general formula (2) described above (NEWPOL PE64 produced by Sanyo Chemical Industries, Ltd.).

$$R-O(CH_2CH_2O)_{12}H \quad (5)$$

In the general formula (5), R represents an alkyl group having a number of carbon atoms of 14 to 15.

TABLE B11

| Comparative Example B4 | % by weight |
|---|---|
| Pure water | 39.2 |
| CAB-O-JET 300 Black | 33.3 |

TABLE B11-continued

| Comparative Example B4 | % by weight |
|---|---|
| DPP | 2 |
| R-O(CH$_2$CH$_2$O)$_{12}$H | 0.5 |
| Glycerol | 25 |

Comparative Example B5

An ink having a composition shown in Table B12 was prepared by using pure water, a dye (C. I. Direct Black 17), DPP as a propylene glycol ether, NEWPOL PE64 (produced by Sanyo Chemical Industries, Ltd., m=30 to 31, n=13 to 14, total average molecular weight: 2,940 to 2,950) as a surfactant composed of a block copolymer represented by the general formula (2) described above, and glycerol as a moistening agent.

TABLE B12

| Comparative Example B5 | % by weight |
|---|---|
| Pure water | 69.5 |
| C. I. Direct Black 17 | 3 |
| DPP | 2 |
| NEWPOL PE64 | 0.5 |
| Glycerol | 25 |

Evaluation

The water base inks for ink-jet recording prepared in Examples B1 to B7 and Comparative Examples B1 to B5 were sufficiently mixed and agitated. After that, the viscosity and the surface tension of each of the water base inks for ink-jet recording as well as the foaming property and the foam stability of each of the inks were measured in order to use them as criteria for the initial introduction performance into the printer head. The measuring methods were the same as those used in Example A's.

Subsequently, a vacuum state is established in an ink container by using a vacuum pump while applying the ultrasonic wave to the water base ink for ink-jet recording prepared in each of Examples B1 to B7 and Comparative Examples B1 to B5 to eliminate the gas contained in each of the water base inks for ink-jet recording concerning Example B's and Comparative Example B's so that the water base inks for ink-jet recording for the recording evaluation were obtained. The recording was performed by using the obtained water base inks for ink-jet recording for the recording evaluation in relation to Example B's and Comparative Example B's respectively with the ink-jet printer used in Example A's.

When the recording was performed as described above, then the evaluation was made for the initial introduction performance into the ink flow passage of the printer head, and the evaluation was made for the feathering and the spread of the ink in the same manner as in Example A's. The overall evaluation was made in the same manner as in Example A's. Results are summarized and shown in Tables B13 and B14.

TABLE B13

| | Ex. B1 | Ex. B2 | Ex. B3 | Ex. B4 | Ex. B5 | Ex. B6 | Ex. B7 |
|---|---|---|---|---|---|---|---|
| Viscosity (mPa·s) | 3.0 | 3.0 | 3.0 | 2.9 | 2.9 | 2.9 | 3.0 |
| Surface tension | 36.0 | 37.0 | 36.0 | 35.0 | 35.0 | 37.0 | 39.0 |

TABLE B13-continued

| | Ex. B1 | Ex. B2 | Ex. B3 | Ex. B4 | Ex. B5 | Ex. B6 | Ex. B7 |
|---|---|---|---|---|---|---|---|
| (mN/m) | | | | | | | |
| Foaming power A (mm) | 90 | 100 | 95 | 85 | 95 | 90 | 80 |
| Foam stability B (mm) | 20 | 25 | 30 | 30 | 25 | 25 | 30 |
| B/A | 0.2 | 0.3 | 0.3 | 0.4 | 0.3 | 0.3 | 0.4 |
| Ink introduction performance, discharge stability | ++ | ++ | ++ | ++ | ++ | ++ | + |
| Feathering | ++ | ++ | ++ | ++ | ++ | ++ | ++ |
| Ink spread | ++ | ++ | ++ | + | + | + | + |
| Overall evaluation | ++ | ++ | ++ | + | + | + | + |

TABLE B14

| | Comp. Ex. B1 | Comp. Ex. B2 | Comp. Ex. B3 | Comp. Ex. B4 | Comp. Ex. B5 |
|---|---|---|---|---|---|
| Viscosity (mPa·s) | 2.9 | 2.9 | 3.0 | 3.0 | 3.1 |
| Surface tension (mN/m) | 43.0 | 38.0 | 37.0 | 35.0 | 36.0 |
| Foaming power A (mm) | 90 | 90 | 100 | 190 | 95 |
| Foam stability B (mm) | 0 | 45 | 50 | 170 | 0 |
| B/A | 0.0 | 0.5 | 0.5 | 0.9 | 0.0 |
| Ink introduction performance, discharge stability | − | + | + | − | ++ |
| Feathering | ++ | ++ | ± | ± | ± |
| Ink spread | ± | − | ++ | + | ++ |
| Overall evaluation | − | − | ± | − | ± |

As described above, in the case of the water base inks for ink-jet recording of the present invention prepared in respective Example B's, the initial introduction performance into the ink flow passage was satisfactory, and the satisfactory recording was successfully attained, in which the feathering of the ink and the insufficient spread of the ink were reduced on the recording paper. On the other hand, in the case of Comparative Examples B's, it was impossible to obtain any satisfactory result, for example, such that the initial introduction performance into the ink flow passage was unsatisfactory, the feathering or the insufficient spread was clearly caused, and it was impossible to obtain any sufficient printing quality.

In Comparative Example B1, the value is zero in relation to the foam stability/foaming power, and the composition apparently has any satisfactory initial introduction-performance into the ink flow passage. However, the surface tension is high, i.e., not less than 40 mN/m, because no surfactant is added. The wettability is low with respect to the member for constructing the ink flow passage of the stacked type printer head. It was impossible for the ink to smoothly enter the ink flow passage of the stacked type printer head, resulting in the result in which the initial introduction performance was unsatisfactory.

According to the facts described above, the following fact has been successfully confirmed. That is, the effect to be obtained is inferior even when each of the dispersible coloring agent, the propylene glycol ether, and the surfactant composed of the block copolymer represented by the general formula (2) described above is used singly. When the dispersible coloring agent, the propylene glycol ether, and the surfactant composed of the block copolymer represented by the general formula (2) described above are used in combination, the water base ink for ink-jet recording is obtained, which has the satisfactory initial introduction performance into the ink flow passage of the printer head and which also successfully satisfies the feathering and the condition of spread of the ink on the recording paper.

Example C

Example C1

A letdown solvent was prepared by agitating and mixing, for 10 minutes, 46.6 parts by weight of pure water, 24.2 parts by weight of glycerol, 2 parts by weight of dipropylene glycol propyl ether (DPP) as a propylene glycol ether, 0.2 part by weight of SANDET END (produced by Sanyo Chemical Industries, Ltd., alkyl group: number of carbon atoms: 12 to 15, number of moles of addition of ethylene oxide: 3, counterion: Na) as a surfactant represented by the general formula (3), 0.2 part by weight of Proxel GXL(s) (produced by Avecia, hereinafter referred to as "GXL(s)") as a fungicidal agent, and 0.1 part by weight of VERZONE Crystal #120K (produced by Daiwa Fine Chemical Co., Ltd., hereinafter referred to as "BT") as a rustproofing agent.

The entire amount of the letdown solvent was added to 26.7 parts by weight of CAB-O-JET 300 black (produced by Cabot, solid content concentration: 15%, balance: water) as a dispersible coloring agent while performing the agitation to effect the letdown, followed by being agitated and mixed for further 30 minutes. After that, the filtration was performed through a membrane filter having a pore diameter of 1 μm to prepare a water base ink for ink-jet recording. The composition of the respective raw materials is shown in Table C1.

TABLE C1

| Example C1 | Parts by weight |
| --- | --- |
| Pure water | 46.6 |
| Glycerol | 24.2 |
| DPP | 2.0 |
| SANDET END | 0.2 |
| GXL(s) | 0.2 |
| BT | 0.1 |
| CAB-O-JET 300 Black | 26.7 |

Example C2

A water base ink for ink-jet recording having a composition shown in Table C2 was prepared in the same manner as in Example C1 except that a letdown solvent was prepared by using SANDET ET (produced by Sanyo Chemical Industries, Ltd., alkyl group: number of carbon atoms: 12, number of moles of addition of ethylene oxide: 4, counterion: triethanolamine) as a surfactant represented by the general formula (3).

TABLE C2

| Example C2 | Parts by weight |
| --- | --- |
| Pure water | 46.6 |
| Glycerol | 24.2 |
| DPP | 2.0 |
| SANDET ET | 0.2 |
| GXL(s) | 0.2 |
| BT | 0.1 |
| CAB-O-JET 300 Black | 26.7 |

Example C3

A water base ink for ink-jet recording having a composition shown in Table C3 was prepared in the same manner as in Example C1 except that a letdown solvent was prepared by using EMAL 20T (produced by Kao Corporation, alkyl group: number of carbon atoms: 12, number of moles of addition of ethylene oxide: 3, counterion: triethanolamine) as a surfactant represented by the general formula (3).

TABLE C3

| Example C3 | Parts by weight |
| --- | --- |
| Pure water | 46.6 |
| Glycerol | 24.2 |
| DPP | 2.0 |
| EMAL 20T | 0.2 |
| GXL(s) | 0.2 |
| BT | 0.1 |
| CAB-O-JET 300 Black | 26.7 |

Example C4

A water base ink for ink-jet recording having a composition shown in Table C4 was prepared in the same manner as in Example C1 except that a letdown solvent was prepared by using tripropylene glycol normal butyl ether (TPnB) as a propylene glycol ether and SANDET EN (produced by Sanyo Chemical Industries, Ltd., alkyl group: number of carbon atoms: 12, number of moles of addition of ethylene oxide: 2, counterion: Na) as a surfactant represented by the general formula (3).

TABLE C4

| Example C4 | Parts by weight |
| --- | --- |
| Pure water | 47.6 |
| Glycerol | 24.2 |
| TPnB | 1.0 |
| SANDET EN | 0.2 |
| GXL(s) | 0.2 |
| BT | 0.1 |
| CAB-O-JET 300 Black | 26.7 |

Example C5

A water base ink for ink-jet recording having a composition shown in Table C5 was prepared in the same manner as in Example C4 except that a letdown solvent was prepared by using EMAL 20C (produced by Kao Corporation, alkyl group: number of carbon atoms: 12, number of moles of addition of ethylene oxide: 3, counterion: Na) as a surfactant represented by the general formula (3).

TABLE C5

| Example C5 | Parts by weight |
| --- | --- |
| Pure water | 47.6 |
| Glycerol | 24.2 |
| TPnB | 1.0 |
| EMAL 20 C | 0.2 |
| GXL(s) | 0.2 |
| BT | 0.1 |
| CAB-O-JET 300 Black | 26.7 |

Comparative Example C1

A water base ink for ink-jet recording having a composition shown in Table C6 was prepared in the same manner as in Example C1 except that a letdown solvent was prepared without blending the surfactant represented by the general formula (3).

TABLE C6

| Comparative Example C1 | Parts by weight |
| --- | --- |
| Pure water | 46.8 |
| Glycerol | 24.2 |
| DPP | 2.0 |
| GXL(s) | 0.2 |
| BT | 0.1 |
| CAB-O-JET 300 Black | 26.7 |

Comparative Example C2

A water base ink for ink-jet recording having a composition shown in Table C7 was prepared in the same manner as in Example C1 except that a letdown solvent was prepared without blending the propylene glycol ether.

TABLE C7

| Comparative Example C2 | Parts by weight |
| --- | --- |
| Pure water | 48.6 |
| Glycerol | 24.2 |
| SANDET END | 0.2 |
| GXL(s) | 0.2 |
| BT | 0.1 |
| CAB-O-JET 300 Black | 26.7 |

Comparative Example C3

A water base ink for ink-jet recording having a composition shown in Table C8 was prepared in the same manner as in Example C1 except that a letdown solvent was prepared by using ETHOMEEN S15 (produced by Lion Akzo Co., Ltd., alkyl group: soybean alkyl, number of moles of addition of ethylene oxide: 5) represented by the following general formula (6) in place of the surfactant represented by the general formula (3) described above (SANDET END produced by Sanyo Chemical Industries, Ltd.).

(6)

In the general formula (6), $R^2$ represents an alkyl group.

TABLE C8

| Comparative Example C3 | Parts by weight |
| --- | --- |
| Pure water | 46.6 |
| Glycerol | 24.2 |
| DPP | 2.0 |
| ETHOMEEN S15 | 0.2 |
| GXL(s) | 0.2 |
| BT | 0.1 |
| CAB-O-JET 300 Black | 26.7 |

Comparative Example C4

A water base ink for ink-jet recording having a composition shown in Table C9 was prepared in the same manner as in Example C1 except that a letdown solvent was prepared by using triethylene glycol butyl ether (BTG) in place of dipropylene glycol propyl ether (DPP).

TABLE C9

| Comparative Example C4 | Parts by weight |
| --- | --- |
| Pure water | 46.6 |
| Glycerol | 24.2 |
| BTG | 2.0 |
| SANDET END | 0.2 |
| GXL(s) | 0.2 |
| BT | 0.1 |
| CAB-O-JET 300 Black | 26.7 |

Evaluation

The water base inks for ink-jet recording prepared in Examples C1 to C5 and Comparative Examples C1 to C4 were sufficiently mixed and agitated. After that, the viscosity and the surface tension of each of the water base inks for ink-jet recording and the initial contact angle of each of the inks with respect to the member for constructing the ink flow passage of the printer head were measured in order to use them as criteria for the initial introduction performance. The initial contact angle of the ink was measured by using a contact angle meter (CA-X type produced by Kyowa Interface Science Co., Ltd.) by using, as a member for constructing the ink flow passage, 42 alloy (Ni—Fe alloy) transferred and adhered with an epoxy adhesive.

The initial introduction performance of the ink into the ink flow passage is satisfactory when the initial contact angle between the ink and the member for constructing the ink flow passage of the printer head is low. When the initial contact angle between the ink and the member for constructing the ink flow passage is not more than 75°, then the wettability is high, and the initial introduction performance is satisfactory. In general, the contact angle correlates with the surface tension of the ink. It is preferable that the surface tension of the ink is not more than 40 mN/m in order to improve the initial introduction performance.

Subsequently, a vacuum state is established in an ink container by using a vacuum pump while applying the ultrasonic wave to the water base ink for ink-jet recording prepared in each of Examples C1 to C5 and Comparative Examples C1 to C4 to eliminate the gas contained in each of the water base inks for ink-jet recording concerning Example C's and Comparative Example C's so that the water base inks for ink-jet recording for the recording evaluation were obtained. The recording was performed by using the obtained water base inks for ink-jet recording for the recording evaluation in relation to Example C's and Comparative Example C's respectively with the ink-jet printer used in Example A's.

When the recording was performed as described above, the evaluation was made for the initial introduction performance, the feathering, and the spread of the ink in the same manner as in Example A's. The overall evaluation was also made on the basis of the same criteria as those used in Example A's. Results are summarized and shown in Tables C10 and C11.

TABLE C10

| | Ex. C1 | Ex. C2 | Ex. C3 | Ex. C4 | Ex. C5 |
| --- | --- | --- | --- | --- | --- |
| Viscosity (mPa·s) | 3.0 | 3.0 | 2.9 | 3.0 | 3.0 |
| Surface tension (mN/m) | 37.0 | 38.0 | 36.0 | 35.5 | 36.0 |

TABLE C10-continued

|  | Ex. C1 | Ex. C2 | Ex. C3 | Ex. C4 | Ex. C5 |
|---|---|---|---|---|---|
| Initial contact angle (°) | 70.5 | 71.0 | 70.5 | 71.5 | 70.5 |
| Ink introduction performance, discharge stability | ++ | ++ | ++ | ++ | ++ |
| Feathering | ++ | ++ | ++ | ++ | ++ |
| Ink spread | ++ | ++ | ++ | + | + |
| Overall evaluation | ++ | ++ | ++ | + | + |

TABLE C11

|  | Comp. Ex. C1 | Comp. Ex. C2 | Comp. Ex. C3 | Comp. Ex. C4 |
|---|---|---|---|---|
| Viscosity (mPa·s) | 2.9 | 2.9 | 3.0 | 2.9 |
| Surface tension (mN/m) | 42.0 | 39.0 | 36.0 | 37.0 |
| Initial contact angle (°) | 81.0 | 82.5 | 78.5 | 78.5 |
| Ink introduction performance, discharge stability | − | + | − | + |
| Feathering | ++ | ++ | + | ± |
| Ink spread | ± | − | ± | ++ |
| Overall evaluation | − | − | − | ± |

As described above, in the case of the water base inks for ink-jet recording of the present invention prepared in respective Example C's, the initial introduction performance into the ink flow passage was satisfactory, and the satisfactory recording was successfully attained, in which the feathering of the ink and the insufficient spread were reduced on the recording paper. On the other hand, in the case of Comparative Example C's, it was impossible to obtain any satisfactory result, for example, such that the initial introduction performance into the ink flow passage was unsatisfactory, the feathering or the insufficient spread was clearly caused, and it was impossible to obtain any sufficient printing quality.

According to the facts described above, the following fact has been successfully confirmed. That is, the effect to be obtained is inferior even when each of the dispersible coloring agent, the propylene glycol ether, and the surfactant represented by the general formula (3) described above is used singly. When the dispersible coloring agent, the propylene glycol ether, and the surfactant represented by the general formula (3) described above are used in combination, the water base ink for ink-jet recording is obtained, which has the satisfactory initial introduction performance into the ink flow passage of the printer head and which also successfully satisfies the feathering and the condition of spread of the ink on the recording paper.

The water base ink for ink-jet recording of the present invention is satisfactory in the initial introduction performance into the ink flow passage of the printer head, especially of the stacked type printer head provided with the narrow ink flow passage having the complicated structure formed therein, and it is possible to avoid the occurrence of the feathering of the ink and the insufficient spread of the ink even when the recording is performed on the regular paper.

An embodiment of an ink jet printer in accordance with the invention will be described as below with reference to the accompanying drawings.

Figure 3:
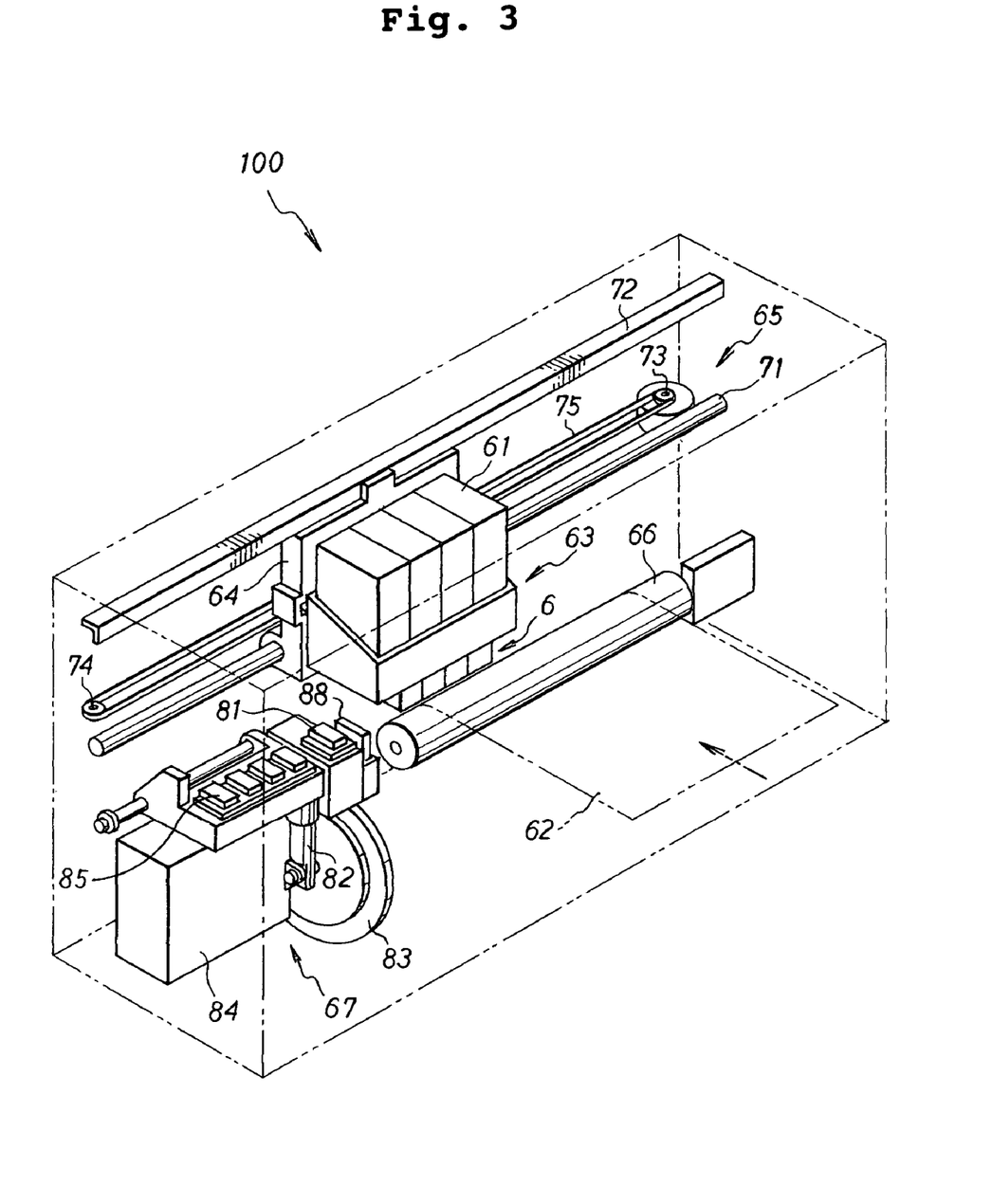
FIG. 3 is a perspective view showing a color ink-jet printer having an ink cartridge which contains ink prepared in examples of the invention.

As shown in FIG. 3, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 3.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

The head 6 is constructed from four blocks that are arranged in parallel to each other and that have pressure chambers, respectively.

A sectional view showing one of the pressure chambers in the head 6 is as shown in FIG. 1.

Although the cartridge 61 is provided on the head 6 in the above embodiment, the cartridge 61 may be provided on or in a case (not shown) of the printer.

What is claimed is:

1. A water base ink for ink-jet recording comprising:
   a self-dispersible coloring agent;
   a propylene glycol ether; and
   a surfactant represented by the following general formula (3):

$$R^1-O-(CH_2CH_2O)_n-SO_3M \qquad (3)$$

wherein n represents an integer of 2 to 4, $R^1$ represents an alkyl group having a number of carbon atoms of 12 to 15, and M represents Na or triethanolamine; and wherein the propylene glycol ether is dipropylene glycol propyl ether.

2. The water base ink for ink-jet recording according to claim 1;
   wherein a content of the propylene glycol ether is 2% by weight to 3% by weight.

3. The water base ink for ink-jet recording according to claim 1;
   wherein the surfactant represented by the general formula (3) is contained by 0.1 to 3% by weight.

4. The water base ink for ink-jet recording according to claim 1;
   wherein a content ratio by weight of propylene glycol ether/surfactant is 5 to 10.

5. An ink cartridge comprising the water base ink for ink-jet recording as defined in claim 1.

6. An ink-jet printer comprising:
   an ink-jet head which has an ink flow passage formed of an Ni alloy and which discharges an ink; and
   the ink cartridge as defined in claim 5 which accommodates the ink to be supplied to the ink-jet head.

7. The ink-jet printer according to claim 6;
   wherein the ink flow passage is formed in a stack composed of sheets formed of an Ni—Fe alloy.

\* \* \* \* \*